(12) United States Patent
Song

(10) Patent No.: US 11,724,747 B2
(45) Date of Patent: Aug. 15, 2023

(54) DASH PANEL ASSEMBLY

(71) Applicants: HYUNDAI MOTOR COMPANY, Seoul (KR); Kia Corporation, Seoul (KR)

(72) Inventor: Han Seok Song, Hwaseong-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 50 days.

(21) Appl. No.: 17/400,736

(22) Filed: Aug. 12, 2021

(65) Prior Publication Data

US 2022/0185385 A1 Jun. 16, 2022

(30) Foreign Application Priority Data

Dec. 16, 2020 (KR) .................. 10-2020-0176151

(51) Int. Cl.
*B62D 25/14* (2006.01)
*B62D 25/08* (2006.01)
*B60R 21/34* (2011.01)

(52) U.S. Cl.
CPC .......... *B62D 25/14* (2013.01); *B62D 25/081* (2013.01); *B60R 21/34* (2013.01); *B60R 2021/343* (2013.01); *B60Y 2306/09* (2013.01); *B62D 25/08* (2013.01)

(58) Field of Classification Search
CPC ...... B62D 25/14; B62D 25/081; B62D 25/08; B60R 21/34; B60R 2021/343; B60Y 2306/09
USPC .......................................................... 296/70
See application file for complete search history.

(56) References Cited

U.S. PATENT DOCUMENTS 6,921,126 B2 * 7/2005 Suh .................. B62D 25/088
296/203.02
2014/0049074 A1 * 2/2014 Lee .................. B62D 25/088
296/203.02

FOREIGN PATENT DOCUMENTS

KR 10-1047990 7/2011

* cited by examiner

*Primary Examiner* — Joseph D. Pape
*Assistant Examiner* — Dana D Ivey
(74) *Attorney, Agent, or Firm* — Lempia Summerfield Katz LLC

(57) ABSTRACT

A dash panel assembly includes: a cowl inner upper panel coupled to a first side of a dash main panel; a cowl inner lower panel coupled to the cowl inner upper panel and the dash main panel, and configured to form a closed section with the cowl inner upper panel; and a dash cross upper member coupled to a second side of the dash main panel and configured to overlap the closed section with the dash main panel disposed therebetween.

13 Claims, 11 Drawing Sheets

FIG. 1 "PRIOR ART"

DASH PANEL ASSEMBLY

CROSS-REFERENCE TO RELATED APPLICATION

This application claims priority to and the benefit of Korean Patent Application No. 10-2020-0176151, filed on Dec. 16, 2020, the entire contents of which are incorporated herein by reference.

FIELD

The present disclosure relates to a dash panel assembly.

BACKGROUND

The statements in this section merely provide background information related to the present disclosure and may not constitute prior art.

An engine compartment is disposed in the front body of a vehicle, and the engine compartment is separated from the interior of the vehicle by a dash panel. A hood is mounted on the upper surface of the engine compartment, and a cowl is installed between the hood and a windshield.

The cowl, as well as the dash panel, serves as a partition between the engine compartment and the interior of the vehicle, and connects the left and right sides of the vehicle to maintain lateral stiffness. Further, the cowl absorbs impact energy generated when the vehicle is in a collision.

There are two types of structures, namely one structure in which the lower portion of a cowl is connected to shock absorber housings, and another structure in which the lower portion of a cowl and shock absorber housings are not connected to each other, depending on types of vehicles or arrangements of components in the engine compartment.

In the former structure, the lower portion of the cowl and the shock absorber housings are connected to form a strong support structure, and the planar sections of a dash panel may be reduced. Therefore, the stiffness of the dash panel to withstand pressure is excellent. In contrast, in the latter structure, the lower portion of the cowl and the shock absorber housings cannot be connected with each other since a layout of the engine compartment is limited, which causes, for example interference of a brake booster. In this case, the planar sections of a dash panel increase. This weakens the stiffness of the dash panel to withstand pressure. In addition, noise, vibration and harshness (NVH) problems may be resulted from booming sound during acceleration, an engine penetration sound, vibration of an accelerator pedal and a brake pedal, etc.

As shown in FIG. 1, in the latter structure, a structure having a closed section is applied to the upper end of a cowl 600. In FIG. 1, WS indicates a windshield, and 610 indicates a dash panel.

If a collision with a pedestrian occurs, it is the upper portion of the cowl where the head of the pedestrian is hit. When the closed section is arranged at the upper portion of the cowl to increase the rigidity of the dash panel, it becomes too hard to diminish hazards that may occur to the pedestrian in the event of the collision with the pedestrian. On the other hand, when an open section is formed at the upper end of the cowl in order to protect pedestrians, the stiffness of the dash panel to withstand pressure is reduced.

The above information disclosed in this Background section is only for enhancement of understanding of the background of the disclosure and therefore it may contain information that does not form the prior art that is already known to a person of ordinary skill in the art.

SUMMARY

The present disclosure provides a dash panel assembly which has both excellent pedestrian protection capability and excellent stiffness of a dash panel to withstand pressure in a vehicle in which the lower portion of a cowl and shock absorber housings cannot be connected.

The present disclosure provides a dash panel assembly, which has a vehicle body structure having improved NVH performance.

In one form, the present disclosure provides a dash panel assembly including a cowl inner upper panel coupled to a first side of a dash main panel; a cowl inner lower panel coupled to the cowl inner upper panel and the dash main panel and forming a closed section with the cowl inner upper panel; and a dash cross upper member coupled to a second side of the dash main panel and configured to overlap the closed section with the dash main panel disposed therebetween.

DRAWINGS

In order that the disclosure may be well understood, there will now be described various forms thereof, given by way of example, reference being made to the accompanying drawings, in which.

Figure 1:
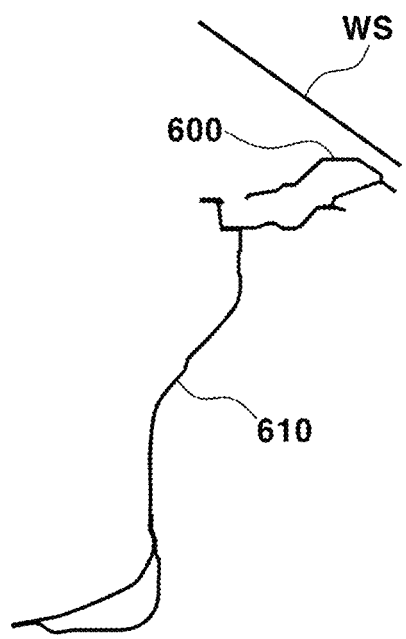
FIG. 1 is a view illustrating a closed section formed at the upper end of a cowl in a vehicle in which the cowl and shock absorber housings cannot be connected.
Figure 2:
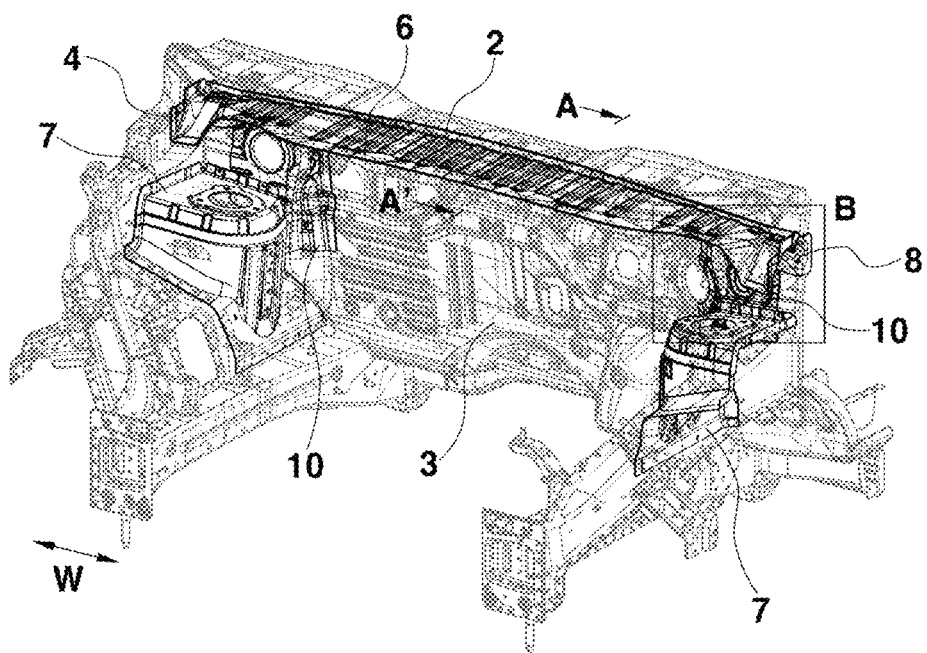
FIG. 2 is a perspective view illustrating a dash panel assembly according to one form of the present disclosure, viewed from an engine compartment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, preferred forms of the present disclosure will be described in detail with reference to the accompanying drawings. Specific structures or functions described in the forms of the present disclosure are merely for illustrative purposes. Forms according to the concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first," "second," etc., may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

The present disclosure provides a dash panel assembly in which the upper portion of a cowl has an open section and is formed as a single panel, thereby improving pedestrian protection capability, increasing the stiffness of a dash panel to withstand pressure, and improving NVH performance.

Hereinafter, reference will be made in detail to various forms of the present disclosure, examples of which are illustrated in the accompanying drawings and described below.

As shown in FIGS. 2 to 5, a dash panel assembly according to one form of the present disclosure includes a cowl upper panel 2, a cowl inner upper panel 4, a cowl inner lower panel, a dash cross upper member 8 and dash side reinforcement members 10.

Figure 3:
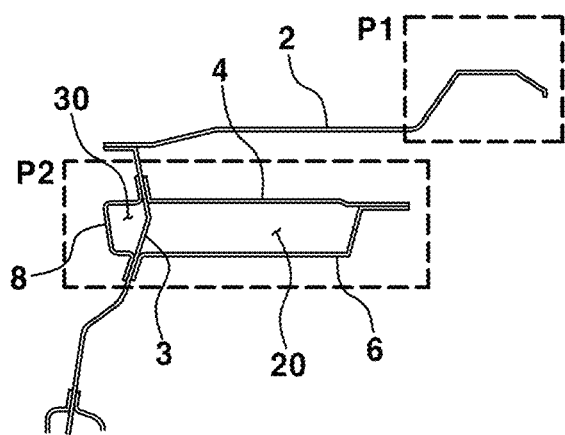
FIG. 3 is a schematic cross-sectional view taken along line A-A' of FIG. 2.
Figure 4:
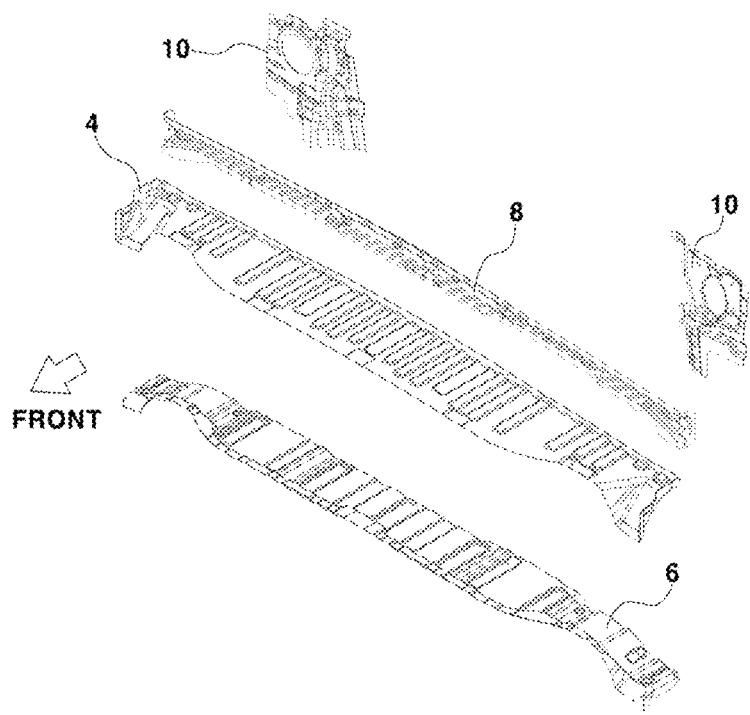
FIG. 4 is an exploded perspective view of the dash panel assembly according to one form of the present disclosure.
Figure 5:
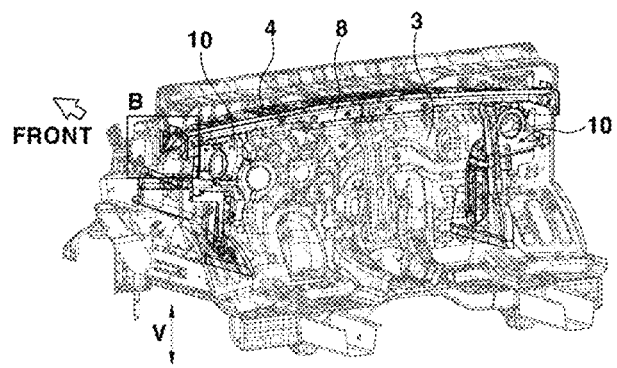
FIG. 5 is a perspective view illustrating the dash panel assembly according to one form of the present disclosure, viewed from a vehicle interior.

As indicated by P1 in FIG. 3, the cowl upper panel 2 has an open section and is formed as a single panel. According to the present disclosure, the cowl upper panel 2 has the open section, instead of the closed section of the upper portion of a conventional cowl, and thus, the dash panel assembly may more effectively protect a pedestrian when the pedestrian collides with a vehicle.

The cowl upper panel 2 is connected to a dash main panel 3 and is supported thereby. The dash main panel 2 extends in a width direction W of the vehicle to separate a vehicle interior and an engine compartment from each other and is disposed substantially along a vertical direction V of the vehicle.

As indicated by P2 in FIG. 3, the cowl inner upper panel 4 and the cowl inner lower panel 6 are disposed under the cowl upper panel 2 and form a closed section. According to one form of the present disclosure, the cowl inner upper panel 4 and the cowl inner lower panel 6 are disposed to be spaced apart by certain distances from the cowl upper panel 2, and more particularly, are disposed to be spaced apart from the cowl upper panel 2 by designated distances in the vertical direction.

Figure 6:
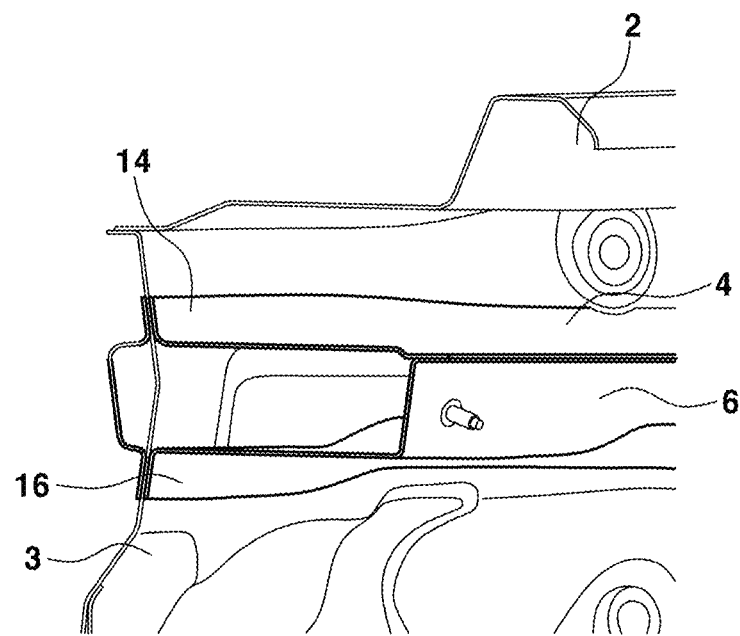
FIG. 6 is a cross-sectional view taken along line A-A' of FIG. 2.

The cowl inner upper panel 4 may be connected to the dash main panel 3, front inner panels 5 and the cowl inner lower panel 6. The cowl inner upper panel 4 is connected to the dash main panel 3 in the width direction W of the vehicle. Referring to FIG. 6, according to one form of the present disclosure, the cowl inner upper panel 4 includes an upper flange 14. The upper flange 14 may be provided to connect the cowl inner upper panel 4 to the dash main panel 3. The upper flange 14 is formed by bending parts of the cowl inner upper panel 4. The upper flange 14 may be attached to the dash main panel 3. As a non-limiting example, the upper flange 14 may be attached to the dash main panel 3 by welding.

Figure 7:
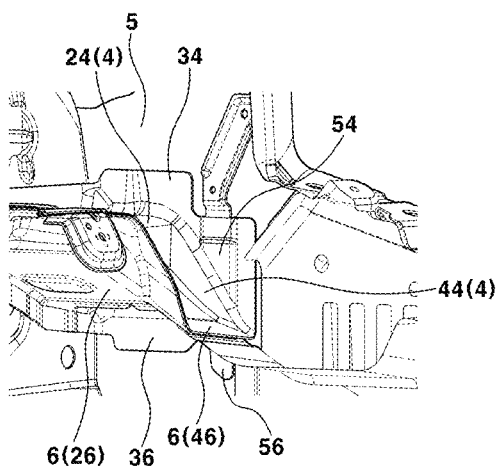
FIG. 7 is an enlarged view of portion B shown in FIGS. 2 and 5, viewed from the engine compartment.

As shown in FIG. 7, both sides of the cowl inner upper panel 4 are connected to the front inner panels 5. The front inner panels 5 are coupled to both sides of the dash main panel 3. According to one form of the present disclosure, each of both sides of the cowl inner upper panel 4 includes side upper flanges 34, 54. The cowl inner upper panel 4 includes first parts 24 and second parts 44. The second parts 44 are bent from the respective first parts 24 by a certain angle. Then the second parts 44 extend from the respective first parts 24 in the width direction of the cowl inner upper panel 4. According to one form of the present disclosure, first side upper flanges 34, which are bent from the respective first parts 24 and then extend, and second side upper flanges 54, which are bent from the respective second parts 44 and then extend, are provided on the cowl inner upper panel 4. Each of the first side upper flanges 34 and the second side upper flanges 54 may be coupled to a corresponding one of the front inner panels 5, and, as a non-limiting example, may be coupled to the corresponding one of the front inner panels 5 by welding.

The cowl inner lower panel 6 may be connected to the dash main panel 3, the front inner panels 5 and the cowl inner upper panel 4. The cowl inner lower panel 6 may be connected to the dash main panel 3 in the width direction W of the vehicle. According to one form of the present disclosure, the cowl inner lower panel 6 includes a lower flange 16. The lower flange 16 may be provided so as to connect the cowl inner lower panel 6 to the dash main panel 3. The lower flange 16 is formed to be bent from the cowl inner lower panel 6, and the cowl inner lower panel 6 may be attached to the dash main panel 3 by the lower flange 16. For example, the lower flange 16 may be attached to the dash main panel 3 by welding.

Referring again to FIG. 3, the cowl inner upper panel 4 and the cowl inner lower panel 6 are coupled to each other to form a first space 20 therein. Therefore, the upper flange 14 and the lower flange 16 are spaced at a certain distance from each other and are coupled to the dash main panel 3.

Referring again to FIG. 7, in a manner similar to the cowl inner upper panel 4, both sides of the cowl inner lower panel 6 are connected to the front inner panels 5. According to one form of the present disclosure, each of both sides of the cowl inner lower panel 6 includes side lower flanges 36, 56. The cowl inner lower panel 6 includes third parts 26 and fourth parts 46. The fourth parts 46 are bent from the respective third parts 26 by a certain angle and then extend, and more particularly, the fourth parts 46 extend from the respective third parts 26 in the width direction of the cowl inner lower panel 6. According to one form of the present disclosure, first side lower flanges 36, which are bent from the respective third parts 26 and then extend, and second side lower flanges 56, which are bent from the respective second parts 46 and then extend, are provided on the cowl inner lower panel 6. Each of the first side lower flanges 36 and the second side lower flanges 56 may be coupled to a corresponding one of the front inner panels 5, and, for example, may be coupled to the corresponding one of the front inner panels 5 by welding.

Referring again to FIG. 5, the dash cross upper member 8 is installed in the interior of the vehicle. The dash cross upper member 8 is provided to enhance the formation of a cross-section. The dash cross upper member 8 is disposed to face the cowl inner upper panel 4 and the cowl inner lower panel 6 with the dash main panel 3 interposed between. According to one form of the present disclosure, the dash cross upper member 8 and the dash main panel 3 form a second space 30, which is vacant, therebetween (with reference to FIG. 3).

Figure 8:
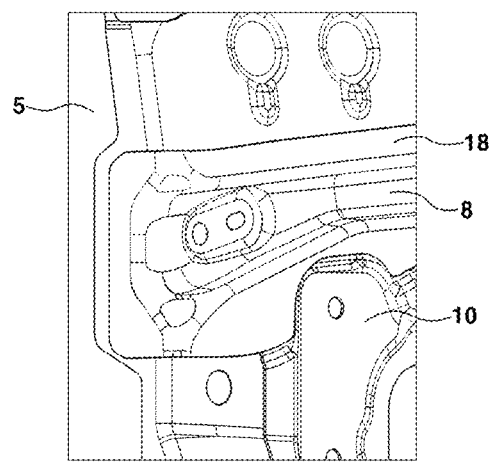
FIG. 8 is an enlarged view of portion B shown in FIGS. 2 and 5, viewed from the vehicle interior.

As shown in FIG. 8, according to one form of the present disclosure, the dash cross upper member 8 includes a flange part 18 formed to be bent from the circumference of the dash cross upper member 8. The dash cross upper member 8 is attached to the side of the dash main panel 3 in the vehicle interior so that phases of the flange part 18 matches with the upper flange 14 and the lower flange 16. As a non-limiting example, the dash cross upper member 8 may be connected to the dash main panel 3 by welding. Both sides of the dash cross upper member 8 are coupled to the front inner panels 5.

Figure 9A:
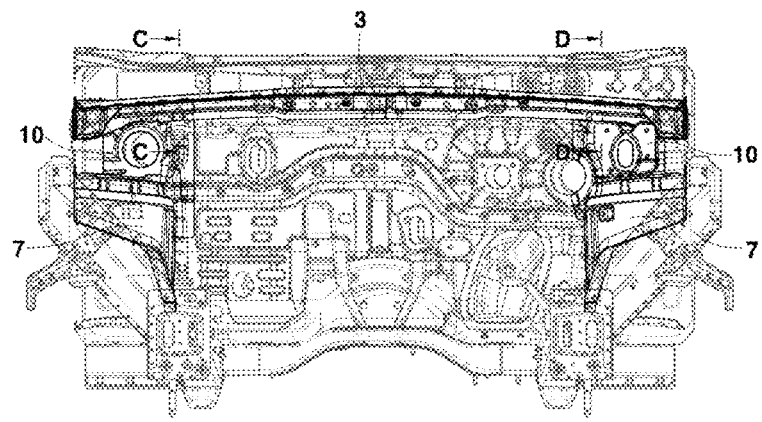
FIG. 9A is a front view of the dash panel assembly according to one form of the present disclosure, as seen from the engine compartment.
Figure 9B:
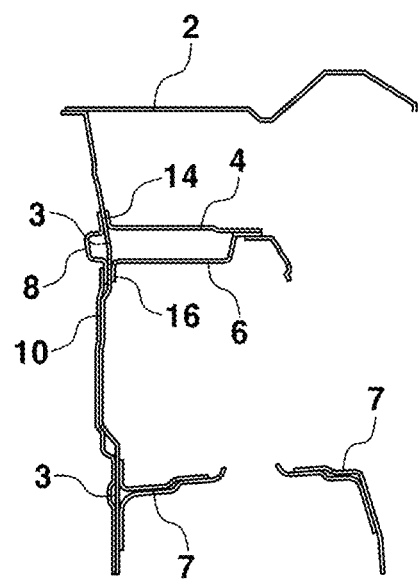
FIG. 9B is a cross-sectional view taken along line C-C of FIG. 9A.
Figure 9C:
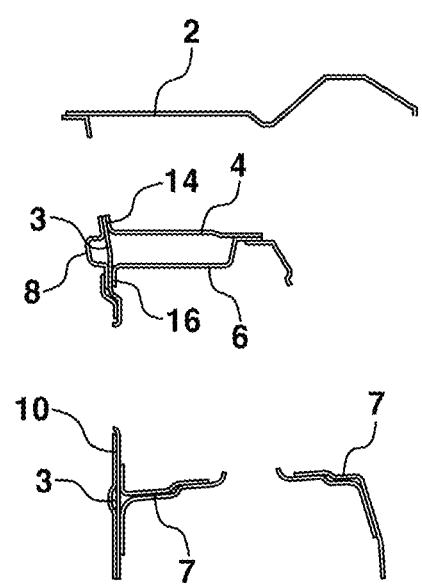
FIG. 9C is a cross-sectional view taken along line D-D of FIG. 9A.

As show in FIGS. 9A to 9C, the dash side reinforcement members 10 are provided to strengthen the connection between the lower portion of the cowl and shock absorber housings 7 of fender aprons.

The dash side reinforcement members 10 are disposed in the vehicle interior opposite the shock absorber housings 7 with the dash main panel 3 interposed between. Particularly, the dash side reinforcement members 10 are attached to the side of the dash main panel 3 located in the vehicle interior so that the phases of the dash side reinforcement members 10 matches the phases of the shock absorber housings 7.

Figure 10A:
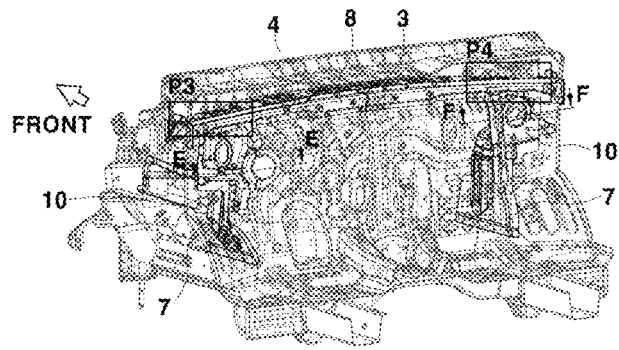
FIG. 10A is a perspective view of the dash panel assembly according to one form of the present disclosure, as seen from the vehicle interior.
Figure 10B:
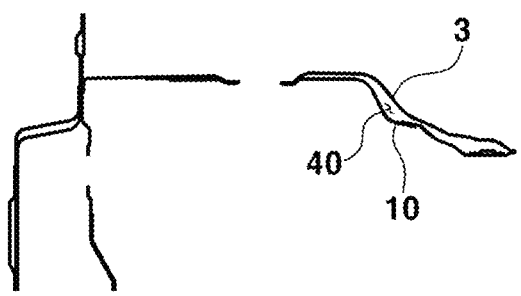
FIG. 10B is a cross-sectional view taken along line E-E of FIG. 10A.
Figure 10C:
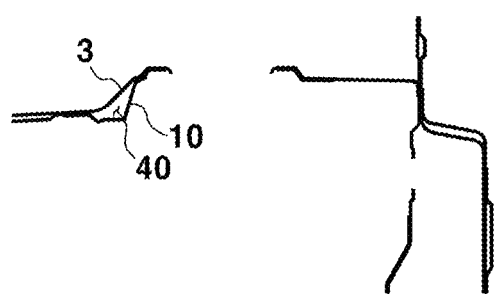
FIG. 10C is a cross-sectional view taken along line F-F of FIG. 10A.

As shown in FIGS. 10A to 10C, the dash side reinforcement members 10 may be configured to have a curved surface so that each of the dash side reinforcement members 10 and the dash main panel 3 form a third space 40 which is vacant. Therefore, additional stiffness may be provided.

Figure 11A:
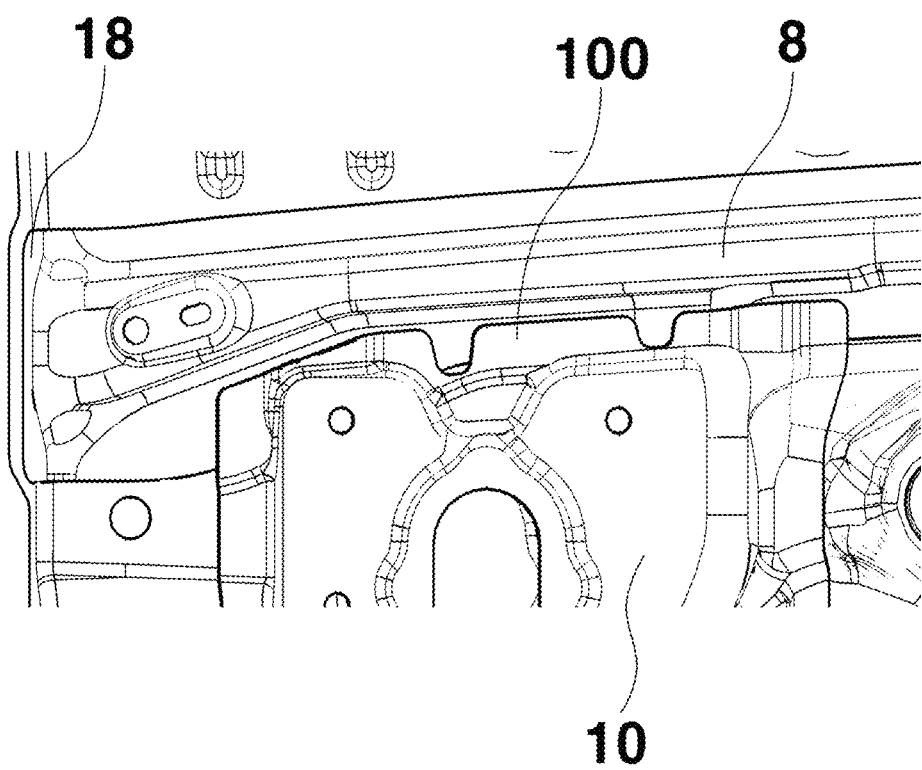
FIG. 11A is an enlarged view of portion P3 of FIG. 10A.
Figure 11B:
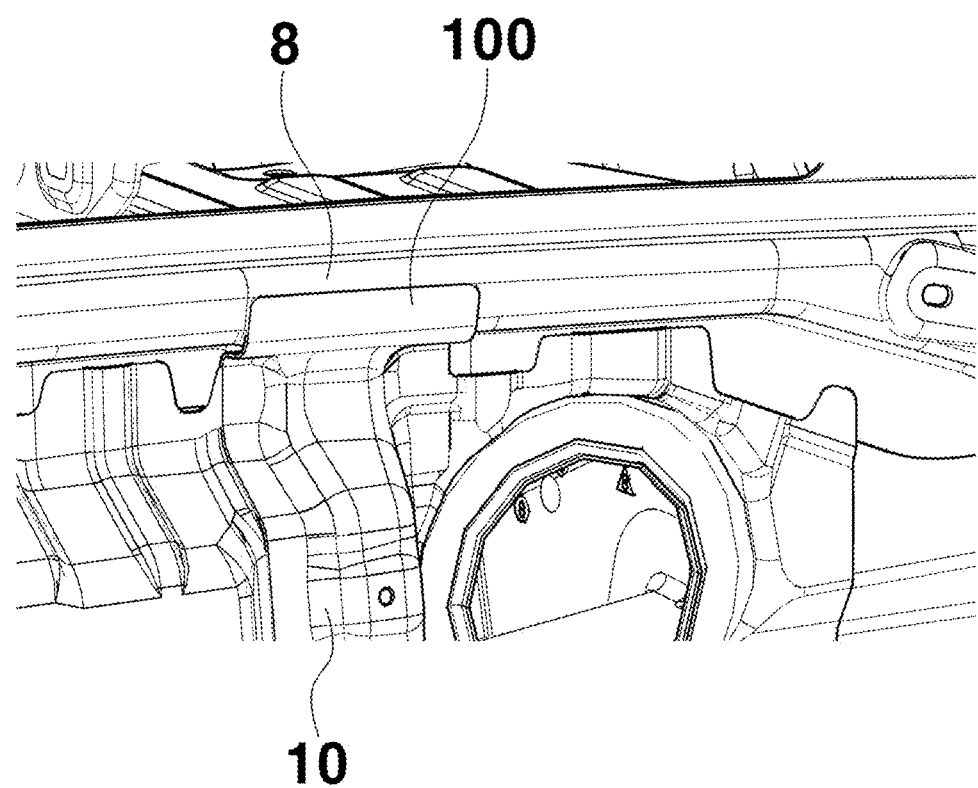
FIG. 11B is an enlarged view of portion P4 of FIG. 10A.

Referring to FIGS. 11A and 11B, the upper portions of the dash side reinforcement members 10 are connected to the dash cross upper member 8. For example, the dash side reinforcement members 10 may be connected to the dash cross upper member 8 by welding, and, more particularly, may be connected to the dash cross upper member 8 using reinforcing flange parts 100 formed at the circumferences of the dash side reinforcement members 10. Accordingly, the connection between the shock absorber housings 7 and the lower portion of the cowl may be further improved.

Figure 12:
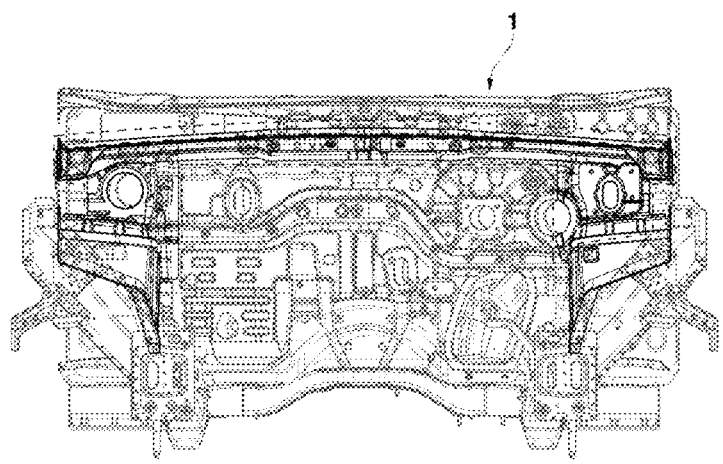
FIG. 12 is a front view of the dash panel assembly according to one form of the present disclosure, as seen from the engine compartment.

The dash panel assembly according to the present disclosure enables the upper portion of the cowl to have an open section, thereby having excellent pedestrian protection performance. The dash panel assembly according to one form of the present disclosure provides a pi($\pi$)-shaped structure, formed by connecting the dash side reinforcement members 10 extending from the shock absorber housings 7 having high rigidity with the closed section of the lower portion of the cowl, thereby reinforcing the stiffness of the dash panel to withstand pressure (with reference to FIG. 12).

The dash panel assembly according to the present disclosure may increase the stiffness of the dash panel to withstand pressure in a vehicle in which the lower portion of a cowl and shock absorber housings of fender aprons cannot be connected to each other. Therefore, the dash panel assembly according to the present disclosure may provide a vehicle having improved NVH performance.

Further, the dash panel assembly according to the present disclosure may improve pedestrian protection performance. As a structure that easily collapses through the open section formed at the upper end of the cowl is applied, the risk of serious head injury may be reduced when the head of a pedestrian collides with the upper portion of the cowl.

In addition, the dash panel assembly according to the present disclosure may reduce costs and weight. When a closed section is formed at the upper portion of the cowl, it may be desired to apply an active hood in case it is insufficient to protect pedestrians from great harm by the cowl. Applying the active hood involves additional components, such as an active hinge, an actuator and a sensor, and thus costs tend to increase. On the other hand, since the dash panel assembly according to the present disclosure does not desire the components for the active hood, costs and weights can be reduced.

The dash panel assembly according to the present disclosure may reduce risk when an offset or front crash occurs. The structure according to the present disclosure may reduce intrusion of the upper portion of the cowl when an offset crash occurs.

The dash panel assembly according to the present disclosure may increase the torsional stiffness of the vehicle body. The dash panel assembly according to the present disclosure connects the vehicle body in the width direction of the vehicle through the closed section, thereby effectively improving the torsional stiffness of the vehicle body.

As is apparent from the above description, the present disclosure provides a dash panel assembly which forms an open section at the upper portion of a cowl, thereby providing excellent pedestrian protection performance.

The dash panel assembly according to the present disclosure may have the excellent stiffness of a dash panel to withstand surface pressure.

The dash panel assembly according to the present disclosure may have improved NVH performance.

The disclosure has been described in detail with reference to preferred forms thereof. However, it will be appreciated by those skilled in the art that changes may be made in these forms without departing from the principles and spirit of the present disclosure.

What is claimed is:

1. A dash panel assembly comprising:
    a cowl inner upper panel coupled to a first side of a dash main panel;
    a cowl inner lower panel coupled to the cowl inner upper panel and the dash main panel, and configured to form a closed section with the cowl inner upper panel and the dash main panel; and
    a dash cross upper member coupled to a second side of the dash main panel and configured to overlap the closed section with the dash main panel disposed therebetween,
    wherein the second side of the dash main panel is opposite to the first side of the dash main panel.

2. The dash panel assembly of claim 1, further comprising a plurality of dash side reinforcement members disposed at the second side of the dash main panel, and configured to overlap shock absorber housings disposed at the first side of the dash main panel with the dash main panel disposed therebetween.

3. The dash panel assembly of claim 2, wherein the dash cross upper member is connected to a portion of each dash side reinforcement member of the plurality of dash side reinforcement members.

4. The dash panel assembly of claim 2, wherein each dash side reinforcement member of the plurality of dash side reinforcement members is coupled to the dash main panel and forms a third space with the dash main panel.

5. The dash panel assembly of claim 1, further comprising a cowl upper panel spaced apart, by a predetermined distance, from the cowl inner upper panel and the cowl inner lower panel, and coupled to an upper portion of the dash main panel,
    wherein an upper end of the cowl upper panel forms an open section.

6. The dash panel assembly of claim 1, wherein the cowl inner upper panel comprises an upper flange formed to be bent from the cowl inner upper panel, to extend in a longitudinal direction of the cowl inner upper panel, and to be coupled to the dash main panel.

7. The dash panel assembly of claim 1, wherein the cowl inner lower panel comprises a lower flange formed to be bent from the cowl inner lower panel, to extend in a length direction of the cowl inner lower panel, and to be coupled to the dash main panel.

8. The dash panel assembly of claim 1, wherein a first side and a second side of each of the cowl inner upper panel and the cowl inner lower panel are coupled to front inner panels disposed at the first side and second side of the dash main panel.

9. The dash panel assembly of claim 8, wherein the cowl inner upper panel comprises side upper flanges formed to be bent from the first and second sides of the cowl inner upper panel and to be coupled to the front inner panels.

10. The dash panel assembly of claim 8, wherein a first side and a second side of the dash cross upper member are coupled to the front inner panels.

11. The dash panel assembly of claim 10, wherein the cowl inner lower panel comprises side lower flanges formed to be bent from the first and second sides of the cowl inner lower panel and to be coupled to the front inner panels.

12. The dash panel assembly of claim 1, wherein the dash cross upper member comprises a flange part formed to be bent from a circumference of the dash cross upper member.

13. The dash panel assembly of claim 1, wherein:
    the cowl inner upper panel, the cowl inner lower panel and the dash main panel form a first space;
    the dash cross upper member and the dash main panel form a second space; and
    the first space and the second space are disposed to face each other with the dash main panel disposed therebetween.

* * * * *